Oct. 1, 1968 R. C. BASSETT 3,404,394

SYMBOL GENERATOR

Filed Oct. 23, 1965 5 Sheets-Sheet 1

INVENTOR.
RAYMOND C. BASSETT
BY Philip M. Bolton
ATTORNEY

INVENTOR.
RAYMOND C. BASSETT
BY Philip M. Bolton
ATTORNEY

INVENTOR.
RAYMOND C. BASSETT
BY Philip M. Bolton
ATTORNEY

INVENTOR.
RAYMOND C. BASSETT
BY Philip M. Bolton
ATTORNEY

INVENTOR
RAYMOND C. BASSETT
BY Philip M. Bolton
ATTORNEY

3,404,394
SYMBOL GENERATOR

Raymond C. Bassett, West Caldwell, N.J., assignor to International Telephone and Telegraph Corporation, a Corporation of Maryland Filed Oct. 23, 1965, Ser. No. 503,825
5 Claims. (Cl. 340—324)

ABSTRACT OF THE DISCLOSURE

Methods and apparatus for generating patterns on a cathode ray tube screen. A pulse frequency divider driven by a clock pulse generator and an oscillator provide pulses and sine waves respectively. The clock pulse generator controls gating circuits to gate out alternate segments of pulses and sine waves which are applied to an oscilloscope. In the second embodiment the oscillator signal is also inverted and segments thereof are additionally selected through an "AND" gate. In a third embodiment there is added to the first embodiment a plurality of dividers in cascade which are then coupled via summing amplifiers to the cathode ray tube.

This invention relates to symbol generators and in particular to a method and apparatus for generating predetermined patterns on a cathode ray tube screen, utilizing gating techniques.

The prior art method of symbol generation on cathode ray tube screens is to generate waveforms that will "write" the pattern or symbol with the flying spot in a lissajous fashion. Accurate symbol generation using this method has the disadvantage of requiring very careful circuit design in order to supply the proper signal amplitudes at the proper time.

Accordingly, an object of this invention is to provide an improved symbol generator utilizing a cathode ray tube, particularly one that is relatively accurate and requires little, if any, critical circuitry.

A further object of this invention is to provide such a symbol generator utilizing substantially digital circuitry.

According to this invention a circuit for generating symbols on the screen of a cathode ray tube is provided comprising means for generating oscillatory waveform signals and means for generating varying D.C. signals. By the term oscillatory waveform, as used in this specification and the claims, is meant a waveform that oscillates at least twice as fast as said D.C. signal varies (i.e. the period of the varying D.C. signals is at least twice as large as the period of the oscillatory waveform signals). The instant invention further comprises control means for applying oscillator waveform signals to one of the deflection means of a cathode ray tube at predetermined spaced intervals and for applying a selected one of the D.C. signals to the other of said deflection means during the said application of the oscilllatory waveform signals to said one of said deflection means at said predetermined spaced intervals.

The invention will now be described in detail in conjunction with the following drawings in which.

According to the invention, a horizontal line may be generated on the screen of a cathode ray tube by applying a D.C. voltage to the $y$-axis deflection means of said cathode ray tube (to determine the vertical position of the horizontal line) and simultaneously applying a few cycles of fixed amplitude oscillator waveform (i.e. a sinewave) to the $x$-axis deflection means of said tube to deflect the beam back and fourth in a horizontal direction. To change the vertical position of said horizontal line, one merely changes the D.C. voltage applied to the $y$-axis deflection means by a predetermined amount. By interchanging the signals to the $x$ and $y$-axis deflection means corresponding vertical lines may be generated. To obtain 45° lines rather than vertical or horizontal lines, two oscillatory waveforms, either in phase with respect to each other or 180° out of phase with respect to each other, are applied to the horizontal and vertical deflection means of the cathode ray tube, respectively. The waveform that is shifted by 180° may be easily obtained according to this invention by applying the output of the oscillatory waveform generator to an inverting amplifier.

A predetermined symbol or pattern comprising a plurality of line segments as described above may be generated by sequentially generating each said line and then repeating this sequence at a rate fast enough (said rate depending on the visual persistence of the cathode ray tube screen) so that there is no apparent flicker on the screen.

Figure 2:
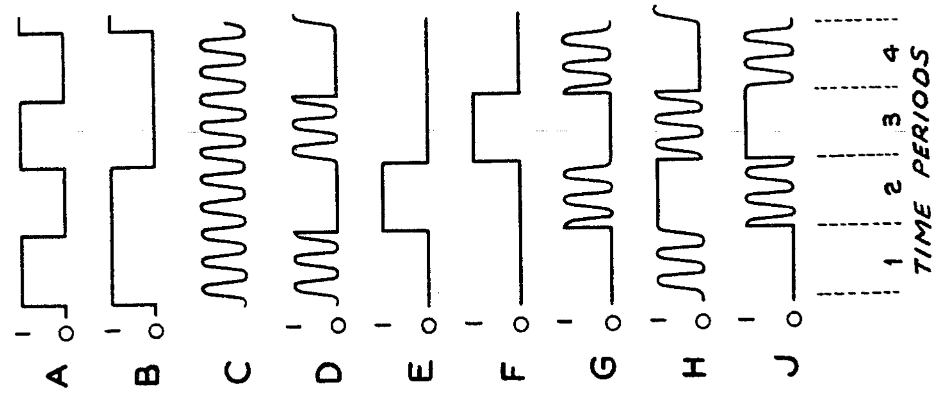
FIG. 2 is a schematic representation of the waveforms at the designated points in FIG. 1.
Figures 1, 3:
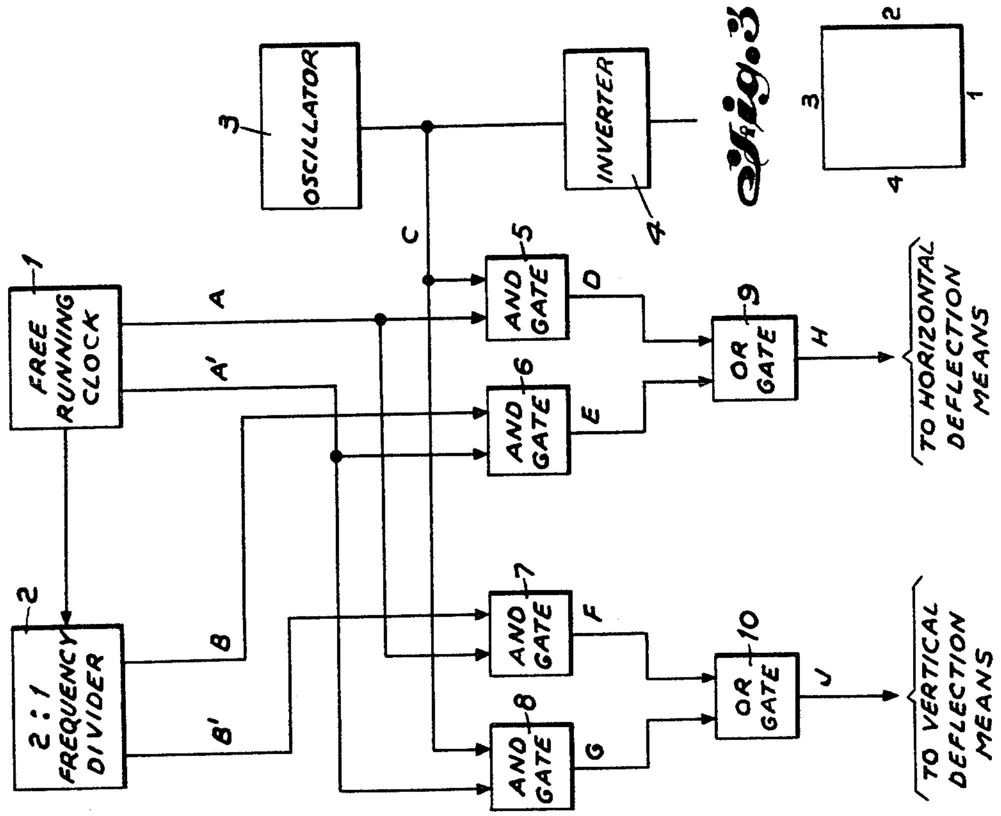
FIG. 1 is a schematic block diagram of a system according to this invention for generating a "square" symbol on a cathode ray tube screen.
FIG. 3 is an illustration of the "square" symbol obtained by means of the circuitry of FIG. 1.

Referring now to FIG. 1, an embodiment of this invention to generate a "square" symbol on a cathode ray tube screen is schematically illustrated. The free running multivibrator 1, which provides the time base for the system, drives a bistable multivibrator 2 which serves as a 2:1 frequency divider. The output of the oscillatory 3 is a sinusoidal waveform which is inverted by inverter 4 to shift its phase by 180°. In the embodiment of FIG. 1 the inverted sinusoidal waveform is not used. The outputs of multivibrators 1 and 2 and the oscillator 3 are then gated via AND-gates 5–8 and OR-gates 9 and 10 to the horizontal and vertical deflection means, respectively, of a cathode ray tube. A typical set of waveforms is shown in FIG 2, the letters of the reference points in FIG. 1 corresponding to the letters designating waveforms shown in FIG. 2. The resulting symbol generated on the screen of the cathode ray tube by the circuit of FIG. 1 is shown in FIG. 3, the reference numbers for the sides of the square representing the time period (denoted in FIG. 2) during which that particular line was generated.

More specifically the operation of the circuit of FIG. 1 will now be explained in more detail. During time period 1 (see FIG. 2) the outputs A and B of the clock 1 and frequency divider 2, respectively, are "1" and the outputs A′ and B′ of the clock 1 and frequency divider 2, respectively, are "0," where "1" and "0" denote the high and low voltage states of the outputs, respectively. These signals disable AND-gates 6, 7 and 8 and enable AND-gate 5, allowing a few cycles of the sinusoidal waveform on lead C (FIG. 1) to be coupled to OR-gate 9 and "0's" to be coupled to the inputs of OR-gate 10. Therefore, during time period 1, the output of OR-gate 9 is a few cycles of the sinusoidal signal and the output of OR-gate 10 is a "0." These signals are then coupled to the deflection means of the cathode ray tube by well known techniques, to produce on the screen thereof a straight line during the said first time period. This line is shown in FIG. 3 as line 1.

During time period 2 output A' and B are "1" and outputs A and B' and "0". This disables AND-gates 5 and 7, and enables AND-gates 6 and 8, allowing a "1" to be coupled through to OR-gate 9 and allowing a few cycles of the sinusoidal signal to be coupled through to OR-gate 10. Therefore at the output of OR-gates 9 and 10 during time period 2 are a "1" (a high voltage D.C. signal) and a few cycles of the sinusoidal signal, respectively, which signals are then appropriately coupled to the deflection means of the cathode ray tube by means of said well known techniques to produce a second straight line on the screen thereof. This line is line 2 in FIG. 3.

In a similar manner appropriate signals are obtained at the outputs of OR-gates 9 and 10 during time periods 3 and 4. The embodiment shown in FIG. 1 generates a symbol on the screen comprising four straight sequentially generated lines. After each of these lines is generated the complete sequence is automatically repeated so that the symbol appears continuous on the screen.

It is seen from the above that one line of a pattern is generated at a time. In order to prevent flicker the sequence is repeated fast enough (i.e., the frequency of the free running multivibrator 1 is high enough) so that due to the persistence of the eye and the visual persistence of the cathode ray tube screen the pattern appears continuous, exhibiting no visible flicker.

Figure 6:
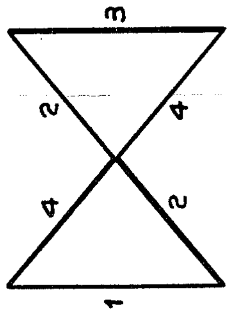
FIG. 6 is an illustration of the symbol generated by means of the circuitry of FIG. 4.
Figure 4:
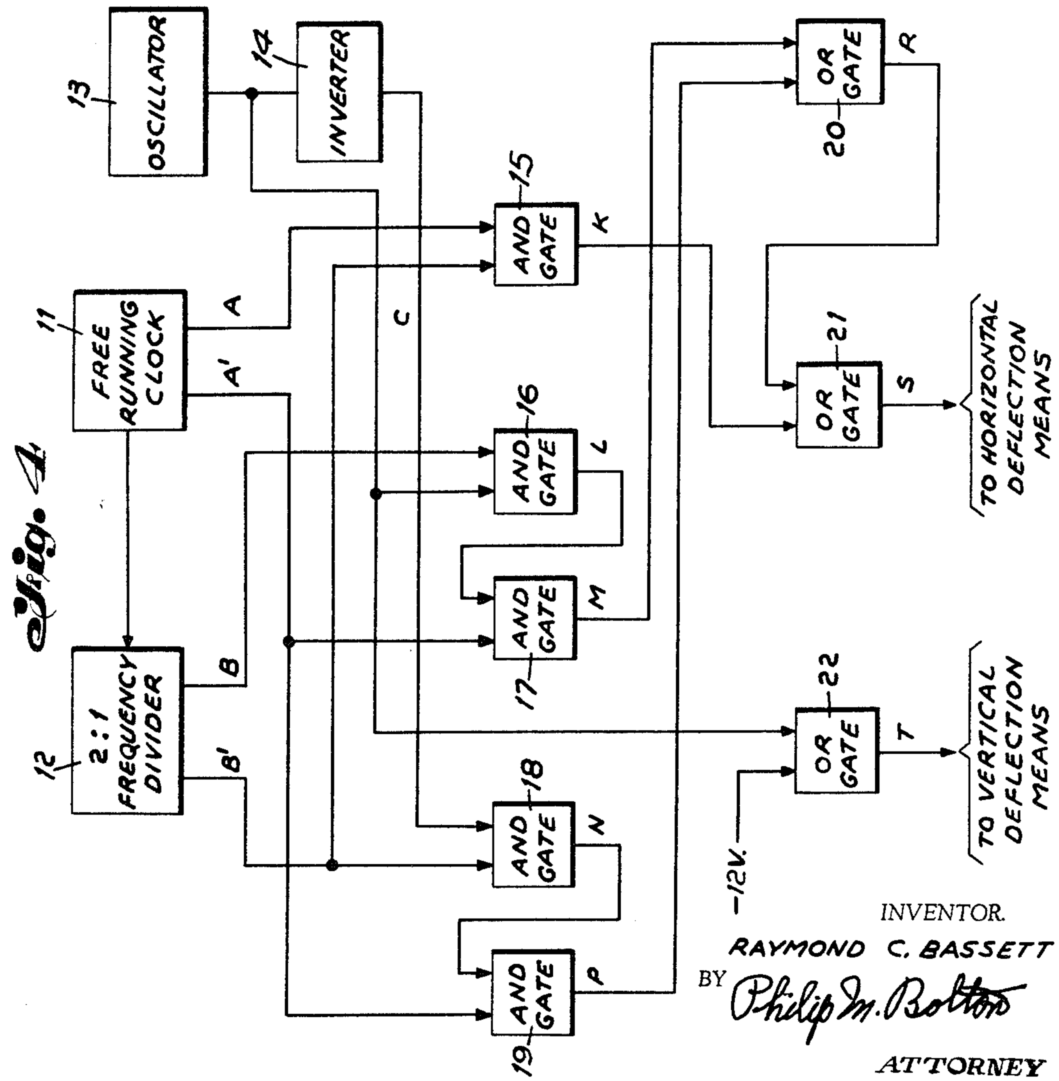
FIG. 4 is a schematic block diagram of a second embodiment of this invention.
Figure 5:
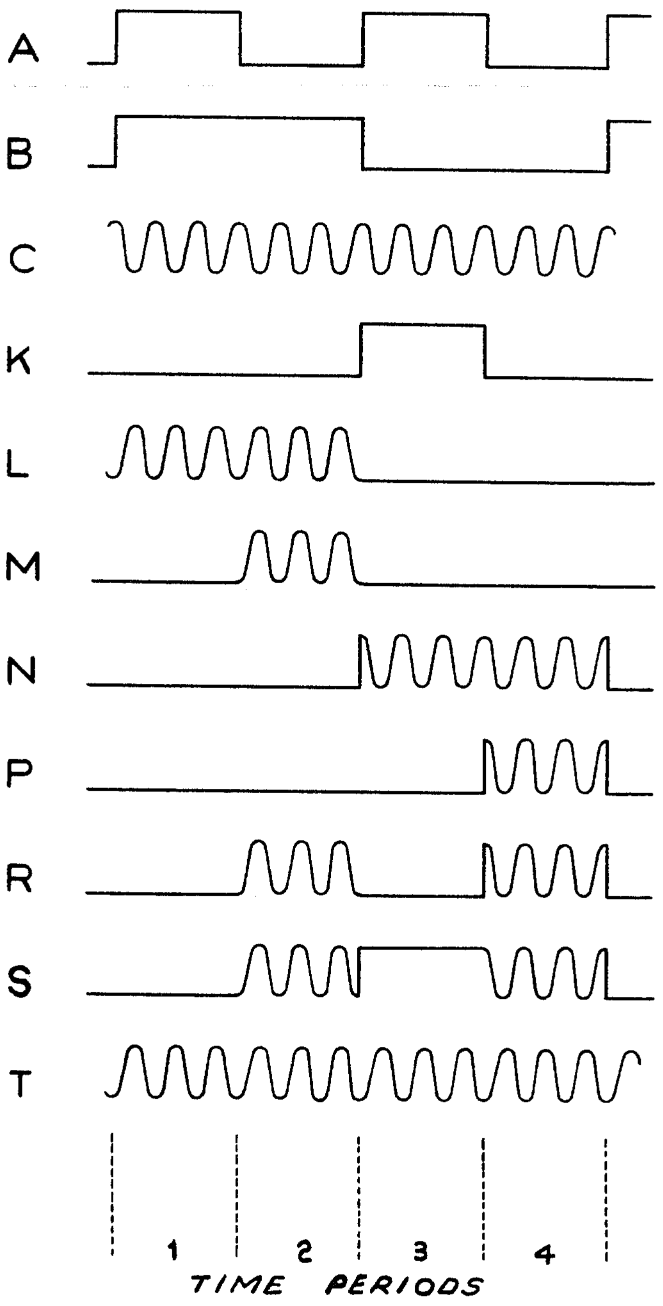
FIG. 5 is a schematic representation of the waveforms at the designated points in FIG. 4.

Another embodiment of this invention is illustrated in FIG. 4 which generates the symbol shown in FIG. 6. The operation of this circuit is substantially similar to that of FIG. 1 except that 45° lines are generated on the cathode ray tube screen in addition to straight lines. A detailed description of the operation of this circuit taken in conjunction with FIGS. 5 and 6 follows.

During the period 1 (see FIG. 5) the outputs A and B of the clock 15 and frequency divider 16, respectively are "1" and the outputs A' and B' of the clock 15 and frequency divider 16, respectively, are "0". These signals disable AND-gates 15, 17, 18 and 19 and enable AND-gate 16. Since AND-gate 17 is disabled by the signal on lead A' the signal from enabled AND-gate 16 does not pass therethrough. OR-gate 22 allows the oscillatory waveform signal from oscillator 13 (shown as a sinewave in FIG. 5) to be present at the vertical deflection means of the cathode ray tube during all of the time periods since its only input is the oscillatory waveform signal. During the said first time period OR-gate 21 is disabled since all of its inputs are "0." Therefore a "0" appears at its output and a vertical line (line 1, FIG. 6) is generated on the screen of the cathode ray tube by means of the oscillatory signal and the "0" being coupled to the deflection means of the cathode ray tube.

During time period 2, the oscillator waveform is again coupled to the vertical deflection means via OR-gate 22. AND-gates 15 and 18 and therefore 19 are disabled and AND-gates 16, and 17 are enabled, allowing the same oscillatory waveform to be coupled to the horizontal deflection means. Thereby the same oscillatory waveform is applied to the horizontal and vertical deflection during time period 2. This results in a 45° line being generated on the cathode ray tube screen in a lissajous manner. (See line 2, FIG. 5.)

During time period 3 another vertical line (line 3, FIG. 5) is generated in a manner similar to the generation of line 1 (FIG. 6) except a "1" is now coupled to the horizontal deflection means instead of a "0."

During time period 4 AND-gates 15 and 16 and therefore 17 are disabled and AND-gates 18 and 19 are enabled. Thereby, the inverted oscillatory waveform (the output of inverter 22) is coupled via AND-gates 18 and 19 and OR-gates 20 and 21 to the horizontal deflection means. Since the two oscillatory waveform signals applied to the two deflection means, respectively, are 180° out of phase with respect to each other, the 45° line, shown in FIG. 6 (labelled as line 4), is generated during this time period in a lissajous manner.

Figure 7:
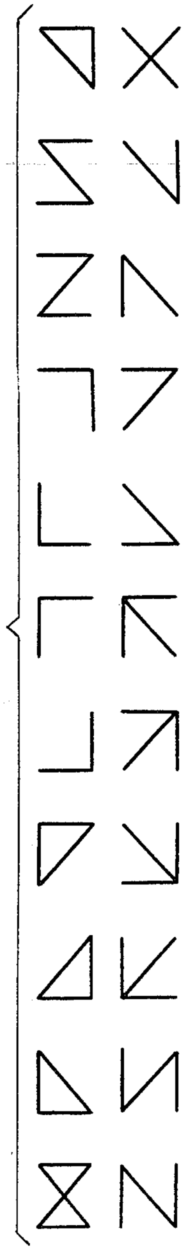
FIG. 7 is an illustration of other symbols readily obtainable according to this invention.

It should be noted that FIGS. 1 and 4 are schematic diagrams of circuits for generating only two particular symbols, respectively, by suitable gating of the clock and frequency divider outputs and oscillator outputs (both normal and phase-shifted) according to this invention, any of the symbols illustrated in FIG. 7 may be generated.

Figure 10:
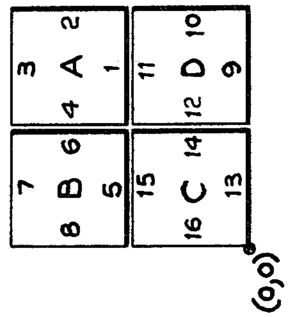
FIG. 10 is an illustration of the symbol obtained by means of the circuit of FIG. 8.
Figure 8:
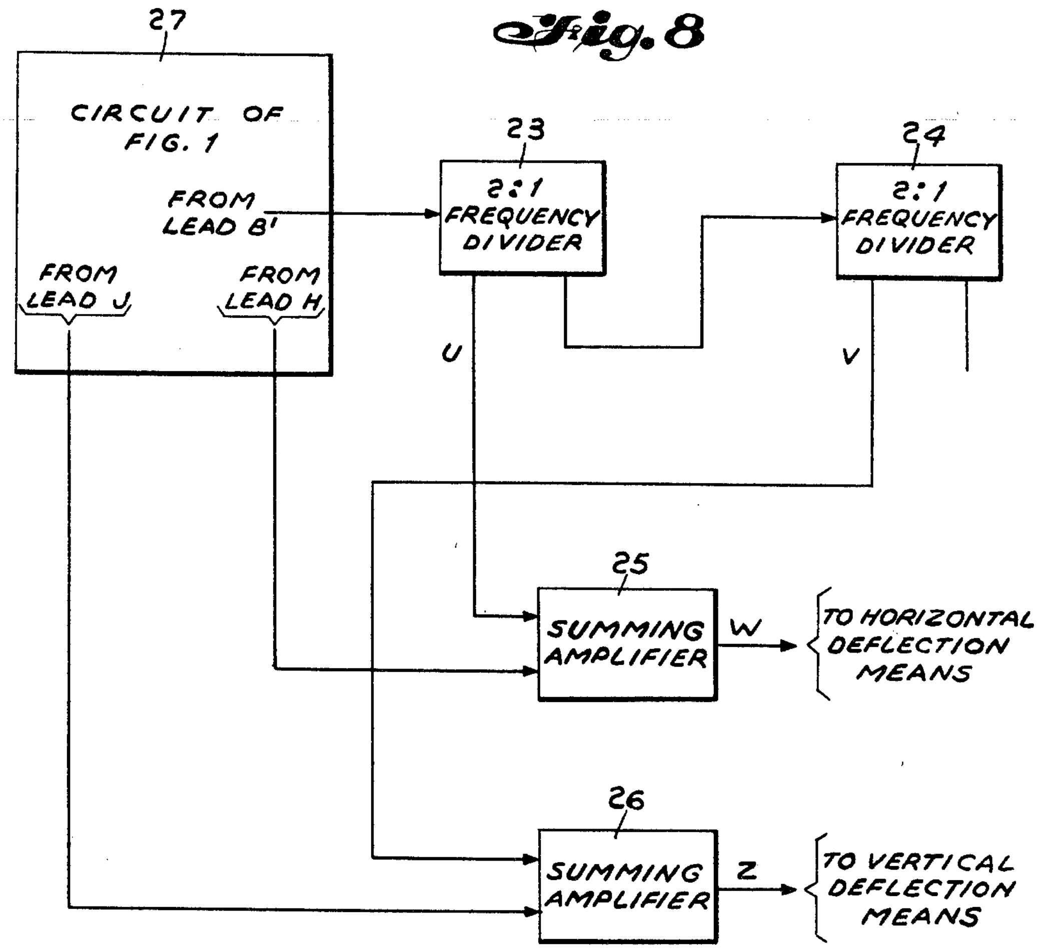
FIG. 8 is a schematic block diagram of a third embodiment of this invention.
Figure 11:
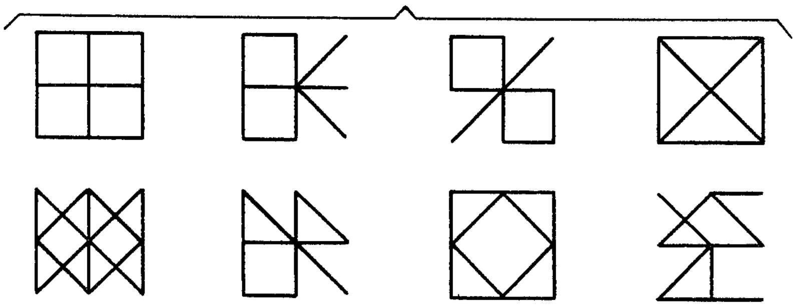
FIG. 11 is an illustration of other more complex symbols obtainable with a system according to this invention.

The system heretofore disclosed may be expanded as shown in FIGURE 8 to generate more complex patterns (for example, those shown in FIGURE 11). This expanded system utilizes the circuitry for generating the symbols as shown in FIGURE 7 and gates the outputs of these circuits in the proper time sequence via summing amplifiers to the deflection means of the cathode ray tube. By means of this arrangement, a plurality of symbols are sequentially displayed at different positions on the cathode ray tube screen with a high enough repetition rate in order to prevent flicker on said screen. Thereby, a single, more complex symbol is generated. In the circuit of FIGURE 8 the complete sequence of events for generating one complete symbol requires 16 time periods of the free running clock whereas the previously shown circuits (generating any of the patterns shown in FIGURE 3) require only 4 time periods of the free running clock for the generation of one complete symbol. For example, in FIG. 10 during the first 4 time periods the square designated by "A" is generated. During the fifth through eighth, ninth through twelfth and thirteenth through sixteenth time periods the squares designated by "B," "C" and "D," respectively (see FIG. 10) are generated. The numerals 1–16 in FIG. 10 denote the time period in which each line is generated. In FIG. 10, the four square symbols are shown separated for clarity, but in actual practice adjacent lines will really be overlapping and will appear as a single line.

The circuit of FIGURE 8 comprises, for example, a circuit according to FIG. 1 (element 27 of FIG. 8) coupled at point B' to two 2:1 frequency dividers 23 and 24. The outputs of this circuit (outputs J and H of FIG. 1) are coupled to the deflection means via summing amplifiers 25 and 26 as shown in FIGURE 8. The 2:1 frequency dividers 23 and 24 are also coupled to the deflection means via said summing amplifiers 25 and 26. The wave forms generated by the circuitry of FIGURE 8 are shown in FIGURE 10. The philosophy behind this circuit is that during each 4 successive time periods fixed D.C. levels (generated by frequency dividers 23 and 24) are selectively added to the horizontal and vertical axis waveforms produced at the outputs of the circuit comprising element 27 in FIG. 8 (the circuit of FIG. 1 in this example). This serves to position each succeeding pattern which is generated during each succeeding 4 time periods at different positions on the cathode ray tube.

Figure 9:
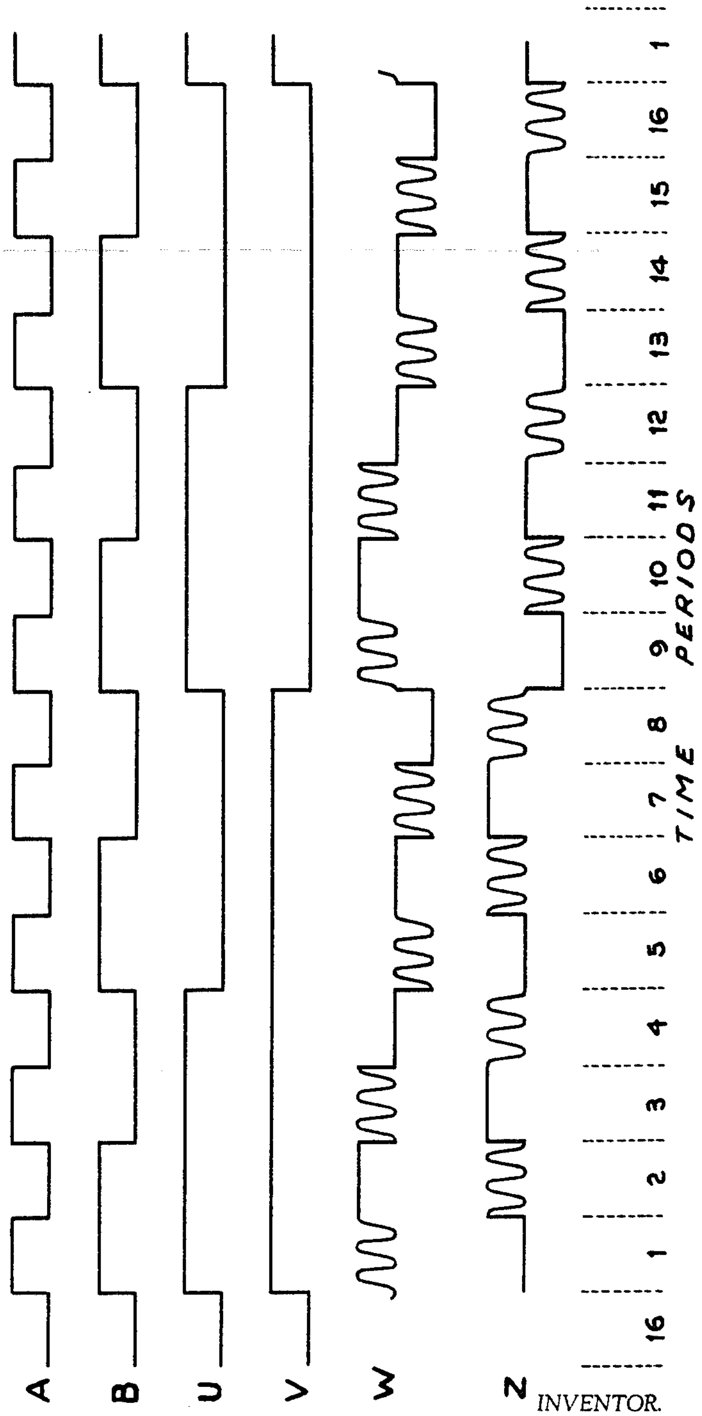
FIG. 9 is a schematic representation of the waveforms at designation points in FIG. 8.

More specifically, during the first four time periods the signal to the horizontal deflection means is the sum of said fixed D.C. level waveform U, FIG. 9., and the waveform at the output of element 27 in FIG. 8 (see waveform H, FIG. 2). During these first four time periods a fixed D.C. level is also added to the signal fed to the vertical deflection means. This places the symbol generated during said first four time periods (shown in FIG. 10 as a square) in the position designated by symbol A in FIG. 10. In a similar manner D.C. levels are selectively added to the outputs of element 27 for the remainder of the time periods to shift the position of the symbol generated thereby at four time period intervals.

It should be noted that element 27 in FIG. 8 may comprise one or more of the circuits which generate the symbols shown in FIG. 7. If more than one type of circuit is used, further gating is required to selectively gate the outputs of the said circuits to the summing means of FIG. 8. This further gating could be designed by anyone reasonably skilled in the art. In such a manner other symbols, such as those shown in FIG. 11, may be generated.

Another method of generating more complex patterns is to simultaneously generate a plurality of the symbols shown in FIG. 7 on the screen of a multibeam cathode ray tube in a predetermined relation to each other.

While I have described above the principles of my invention in connection with specific apparatus, it is to be clearly understood that this description is made only by way of example and not as a limitation to the scope of my invention, as set forth in the objections thereof and in the accompanying claims.

I claim:

1. A circuit for applying signals to aplurality of deflection means of a cathode ray tube to generate symbols on its screen comprising:

means for generating oscillatory waveform signals;

means for generating varying D.C. signals;

control means for repeatedly applying given combinations of two of said signals simultaneously to said deflection means at predetermined intervals, said intervals being spaced by the application of different combinations of said signals at other predetermined spaced intervals, at least one of said applied signals always being an oscillatory waveform signal, means for generating second varying D.C. signals; and adding means coupling the outputs of said second generating means and said control means to said deflection means for selectively adding said second varying D.C. signals to the outputs of said control means.

2. A circuit according to claim 1 wherein said means for generating varying D.C. signals comprises:

a free running clock means; and a first 2:1 frequency divider coupled to the output of said free running clock.

3. A circuit according to claim 2 wherein said means for generating second varying D.C. signals comprises:

a second 2:1 frequency divider coupled to the output of said first frequency divider; and a third 2:1 frequency divider coupled to the output of said second frequency divider.

4. A circuit according to claim 3 wherein said adding means comprises summing amplifiers.

5. The method of applying signals to a plurality of deflection means of a cathode ray tube to generate symbols on its screen comprising the steps of:

generating oscillatory waveform signals;

generating varying D.C. voltage signals;

applying said oscillatory waveform signals to one of said deflection means at predetermined spaced intervals;

applying a selected one of said D.C. signals to the other of said deflection means during the application of said oscillatory waveform signals to said one of said deflection means at said predetermined spaced intervals;

applying different combinations of said signals to said deflection means at spaced intervals between said predetermined spaced intervals, at least one of said applied signals always being an oscillatory waveform signal;

generating second varying D.C. signals; and adding said D.C. signals selectively to the signals applied to each of said deflection means during each of said intervals.

References Cited

UNITED STATES PATENTS 3,283,317 11/1966 Courter ------------ 340—324

RODNEY D. BENNETT, *Primary Examiner.*

T. H. TUBBESING, *Assistant Examiner.*